United States Patent [19]

Frank, deceased

[11] Patent Number: 5,254,599
[45] Date of Patent: Oct. 19, 1993

[54] PLASTIC MOLDINGS MADE OF WATER-EXPANDED POLYMER RESIN

[75] Inventor: Lothar Frank, deceased, late of Plüderhausen, Fed. Rep. of Germany, by Brigitte Frank, legal representative

[73] Assignee: Schock & Co. GmbH, Schorndorf, Fed. Rep. of Germany

[21] Appl. No.: 835,125

[22] Filed: Feb. 12, 1992

[30] Foreign Application Priority Data

Feb. 13, 1991 [DE] Fed. Rep. of Germany ....... 4104295

[51] Int. Cl.$^5$ .............................................. C08G 18/14
[52] U.S. Cl. ........................................ 521/65; 521/72; 521/82; 521/99; 521/122; 521/123; 521/109.1; 521/117; 521/130; 521/121; 521/149; 523/440; 523/443; 524/560; 524/561; 524/801; 524/832; 524/833
[58] Field of Search ....................... 521/65, 72, 82, 99, 521/122, 123, 109.1, 117, 130, 121, 149; 523/440, 443; 524/560, 561, 801, 832, 833

[56] References Cited

FOREIGN PATENT DOCUMENTS

| | | |
|---|---|---|
| 643164 | 5/1964 | Belgium . |
| 1569541 | 4/1970 | Fed. Rep. of Germany . |
| 3733821 | 4/1989 | Fed. Rep. of Germany . |
| 2254583 | 7/1975 | France . |
| 471841 | 6/1969 | Switzerland . |

OTHER PUBLICATIONS

Kurt Frisch and James H. Saunders, *Plastic Foams*, pp. 538, 708, 710–712, 749, 779, 780, New York 1973.

Calvin J. Benning, *Plastic Foams: the physics and chemistry of product performance and process technology*, pp. 560–564, 1973.

*Primary Examiner*—Maurice J. Welsh
*Attorney, Agent, or Firm*—Flynn, Thiel, Boutell & Tanis

[57] ABSTRACT

To arrive at an economical method of producing water-expanded polymer resin moldings, it is proposed that a monomer component and a cross-linker on an acrylate basis and/or a PMMA prepolymer be used as resin-forming components of a curable mixture, with the weight ratio of the water component to the resin-forming component being at least 1:1.

33 Claims, No Drawings

PLASTIC MOLDINGS MADE OF WATER-EXPANDED POLYMER RESIN

The invention relates to a plastic molding made of a water-expanded polymer resin consisting of a curable mixture containing a water component which is emulsified by an emulsifier component in a resin-forming component.

The type of polyreaction occurring here is fundamentally different from the so-called dispersion polyreaction where the mixture consisting of water and resin-forming component is present as an oil-in-water emulsion. The result of such a polyreaction is a fine-particle polymer substance.

In the subject matter of the invention, the curable mixture is present as a water-in-oil emulsion, and the type of polyreaction is that of the mass polyreaction (formerly block polyreaction). Therefore, it is not a plurality of polymer pellets that is obtained as reaction product but instead a continuous polymer framework which defines the external dimensions of the molding.

Furthermore, water-expanded polymer resins differ in principle from polymer resin foams as gas is not used as expanding agent but instead finely distributed water droplets are introduced in the form of an emulsion into the resin-forming component, and during the curing process the water components in droplet form initially remain enclosed in the resin. The water is expelled from the resin framework by a subsequent drying process, and a foam-like resin structure which does, however, have a very regular pore structure remains. Water-expanded polymer resins are known on the basis of polyester materials, and it is said of these materials that they can be handled and worked similarly to wood.

However, the starting products for polyester resins are relatively expensive and so the object underlying the present invention is to propose a water-expanded polymer resin molding which is based on a more economical resin component.

This object is accomplished in accordance with the invention by the resin-forming component of the curable mixture containing a monomer component and a cross-linker on an acrylate basis and/or a PMMA prepolymer and by the weight ratio of the water component to the resin-forming component being at least 1:1.

On account of the favorable chemical structure, polyester starting products are easily workable with water to form an emulsion, which is not the case with the starting products of acrylate resins owing to their different kind of chemical structure.

On the other hand, acrylate resin is considerably more economical to produce and has proven its worth in the manufacture of plastic moldings, in particular, for kitchen and sanitary facilities, particularly in view of its excellent surface characteristics for these fields of use.

The present invention makes it possible for the first time to manufacture plastic moldings from a water-expanded polymer resin on an acrylate basis.

In accordance with the invention, the curable mixture may contain an inorganic, particle-shaped filler, which is surprising because fine particles normally have a demulsifying effect.

The mean particle size of the filler may vary over a wide range, and the mean particle size of the filler preferably lies in the range of approximately 50 $\mu$m to 15 000 $\mu$m.

With a very fine filler particle size, i.e., at the bottom end of the above-mentioned range, a homogeneous structure of the plastic molding is obtained, whereas a structure similar to the synthetic stones is obtained with particle sizes at the top end of the above-mentioned particle size range. However, with the use of water-expanded polymer resin, a saving of polymer is possible and, therefore, these moldings can be produced with a substantial reduction in raw material costs. Furthermore, with the saving of polymer substance, there is also a saving in weight which can range from one third to 80%.

In the event that filler particles are present in the curable mixture, the effect of the saving in weight is, of course, poorer. This can, in turn, be increased by using hollow bodies such as, for example, foamed glass beads or ceramic material at least partially as filler particles.

Silicon dioxides such as, for example, quartz powder, crystobalite powder and the like or aluminum trihydroxide, are used as particle-shaped fillers.

The choice of filler brings about the hardness in the surface region of the molding and, therefore, the filler is selected according to the purpose of the moldings.

The monomer component will preferably contain methacrylate, methyl methacrylate, butyl acrylate, acrylonitrile and/or styrene singly or in a mixture.

Substances with at least two acrylate groups are preferred as cross-linkers and, in particular, trimethylolpropantrimethacrylate (also known as 2-ethyl-2(hydroxymethyl)-1,3-propandiol-trimethacrylate) or ethylene glycol dimethacrylate are recommended.

The cross-linker is added to the curable mixture in a proportion of up to 10% by weight. A sufficient 3-dimensional cross linkage of the polymer structure is thereby obtained so that, in particular, the important characteristics such as screwing stability of the water-expanded polyacrylate resin and the pressure resistance, in particular, in the edge or end edge region for use in kitchen and/or sanitary facilities, are provided. The screwability is particularly important because screws can then be screwed into the molding like into wood and so assembly, for example, of worktops in kitchen furniture is possible without a lot of preparation work.

This greatly facilitates handling and use of such worktops as tops not only weigh substantially less than the hitherto conventional particle boards, which is important particularly with today's conventional, continuous worktops which may be several meters long, but the screwability is also better and so, for example, screws can be screwed into the molding without holes having to be drilled beforehand.

As described previously, the resin-forming component can be formed by a mixture of monomers and cross-linkers on an acrylate basis. However, polyacrylate prepolymers (particularly PMMA) can also be added to the resin-forming component. In such a case it is possible to work without cross-linkers. The prepolymers are preferably used with a molecular weight in the range of approximately 40 000 to 100 000. It is very advantageous for the prepolymers to have a molecular weight of approximately 70 000.

The proportion of the (PMMA) prepolymers in the resin-forming component can be varied over a wide range, for example, up to 30% by weight. Normally proportions of 10 to 30% by weight are chosen, a preferred mixture contains approximately 20% by weight.

In the polymerization of the acrylates, the performance of the method is extremely important during the polymerization as a significant decrease in volume occurs during the curing. In the conventional use of acrylate casting resins, a prepolymer component is added to counteract this decrease in volume as the bonds already formed in the prepolymer proportionally bring about a reduction of the shrinkage effect.

As the polyreaction of the resins on an acrylate basis takes place exothermally, a very precise temperature check is normally necessary to prevent a too rapid reaction from starting, which results in tensions in the finished molding, as the decrease in volume is prevented by the afterflow of resin-forming material which is not yet cured.

These problems occur to a much less extent with the water-expanded acrylate resins as a moderating substance for the reaction rate of the curing process is practically built into the polymer by the water component. The high thermal capacity of water ensures that excessive energy is buffered by the water components and, therefore, the polyreaction usually takes place in the range of 40° to 50° C. This relatively low temperature for acrylate systems results in a particularly gentle curing, i.e., owing to the retarded curing process, tensions occur at the most to a minor extent in the material.

The shrinkage effect is likewise strongly reduced by the water component which remains constant in volume and replaces polymer material.

The addition of PMMA prepolymers does also counteract the residual effect in the water-expanded acrylate system. In the present case, however, the primary reason for the addition of the PMMA prepolymers is that the viscosity of the resin-forming component and of the curing mixture can thereby be influenced as a whole so as to obtain optimum viscosity for the casting process.

As the water component in the curable mixture increases, the viscosity of the mixture as a whole also increases. Therefore, the weight ratio of the water component to the resin-forming component in the curable mixture will preferably not substantially exceed a ratio of approximately 4:1 if the curable mixture is to be used for a casting process.

The emulsifier component is an important constituent for the quality of the water-expanded acrylic resin product obtained.

Decisive in the choice of the emulsifier component is that it be able to keep the water component in the curable mixture in fine droplet form stable at the storing temperature (usually room temperature) and at the reaction temperature.

The rule applicable to the selection of emulsifier components is that emulsifiers or emulsifier mixtures which in the mixture of resin-forming component and water result in an increase in viscosity of the total mixture will be suitable for the purposes of the invention. It is important that the water component should be present in a very finely distributed form, i.e., in fine droplet form, and that the individual water droplets should act similarly to finely distributed solids to increase the viscosity. The viscosity increases with an increase in the water component in the total mixture.

The water component will preferably be present with a mean droplet diameter of 50 μm at the most in the curable mixture. The droplet diameter preferably lies in the range of approximately 20 to 30 μm.

The proportion of the emulsifier component in the curable mixture depends on the water content which is to remain emulsified in the curable mixture. It has been found that normally 0.5 to 6% by weight of emulsifier is adequate.

The formulation of the emulsifier component should be such that the emulsion of the curable mixture has a substantially higher viscosity than the resin-forming component. This is an indication that the water component is present in a sufficiently finely distributed form. A commonly observed increase in viscosity for the emulsifiers which can be used to produce the inventive molding, in the case where the ratio of water to resin-forming component is 2:1, is at least 20-fold. In the event that PMMA prepolymers are present in the resin-forming component, there is a much more dramatic rise in viscosity which may, for example, be 2000-fold.

In the event that the water component is present in the ratio of approximately 4:1 to the resin-forming component, an increase in viscosity by the factor of 300 is obtained with resin-forming components without prepolymer, whereas in the case where approximately 10% PMMA prepolymer is present in the resin-forming component, there is, for example, an increase in viscosity by the factor of 3000.

A preferred emulsifier component contains one or several polyoxyethylene block copolymers which are commercially available, for example, under the product name "Hypermer B 246" and "Hypermer 2296". Hypermer B 246 has a molecular weight of approximately 5000 and a wax-like solidity. Hypermer 2269 is a liquid copolymer and has a viscosity at 25° C. of approximately 1000 to 1500 mpas. The above-mentioned products are marketed by ICI Specialty Chemicals. With the two above-mentioned emulsifier components, a mixture of the component "Hypermer B 246" and the component "Hypermer 2296" in the ratio of 1:2 has proven particularly advantageous.

Emulsifier components comprised as mixed esters of glycerol, fatty acids and sorbitans are similarly effective.

Sulfonates can likewise be used as emulsifier components. In both cases, it must be tested beforehand whether the emulsifier component can bring about the previously mentioned increase in viscosity in the mixture consisting of resin-forming component and water component.

If an optimum emulsifier system is used, a very thin skin is practically formed around the water droplets by the emulsifier and possibly with constituents from the resin-forming component which stabilize the water droplets in the emulsion.

In addition to the previously described constituents, the curable mixture does, of course, contain a catalyst, for example, on a diacyl peroxide basis, in particular dibenzoyl peroxide.

Furthermore, an activating agent is added to the mixture, and, for example, dimethyl para-toluidine, various amines or also t-butyl permaleinate with sulfur compound or amines such as, for example, tetrahydro-1,4-oxazine, have proven favorable.

In the manufacturing process, it is possible to prepare two mixtures which coincide substantially, with one containing the catalyst and the other the activating agent. Both mixtures, one containing the catalyst, the other the activating agent, have a sufficient pot life for the usual handling of the mixtures and only have to be mixed together shortly before the casting process and metered together into the mold.

Degasification of the curable mixture is possible. It leaves the characteristics of the emulsion substantially unchanged.

As explained previously, particle-shaped solids can be added to the emulsions of the curable mixture and are then present in dispersed form in the mixture. Surprisingly, no demulsifying effect is achieved with the addition of the solids which can be fed into the finished curable mixture. This means that with good coordination of the emulsifier component, a very stable emulsifying effect is obtained for the water components.

The curable mixture as a whole is selected such that the molding has essentially closed pores after the curing reaction and after a subsequent drying step. This means that in the curing process, the water droplets are initially enclosed in the polymer framework and that during the drying step the water travels via diffusion out of the molding.

On average, the pore size in the molding is preferably less than 50 $\mu$m, but smaller pore sizes are preferred.

The previously described moldings according to the invention are ideal components for the manufacture of two- or multi-layered moldings with a polymer cover layer and a carrier layer. Herein the carrier layer is formed by a molding made of water-expanded polymer resin.

Owing to the low specific weight of the inventive carrier layer and yet the high stability provided by it, these two- or multi-layered moldings are suited in particular for the manufacture of products such as, for example, worktops or similar parts in kitchen and sanitary facilities which have a large surface. Owing to the stability of the carrier layer which is by all means comparable with wood, very large parts can be produced and even with large dimensions still have adequate bearing capacity.

By moldings not only plate-shaped materials are to be understood but also parts such as kitchen sinks, bath tubs, shower tubs, washhand basins or also strips of molding and the like.

The cover layer is preferably first formed in a mold and the carrier layer then molded onto it.

With appropriate choice of the resin-forming component, however, a carrier layer is also obtainable which can be adhesively connected to a cover layer. Of course, the precondition here is that the solvents usually present in adhesives do not solvate and attack the polymer structure of the water-expanded polymer resin.

The cover layer of the two- or multi-layered molding may also contain an inorganic, particle-shaped filler. In contrast with the particle size in the carrier layer, a range of from about 5 to 50 $\mu$m is preferred for the size of these particles.

Normally the carrier layer will provide the mechanical stability and, in particular, also the bearing capacity of the molding, while the cover layer has the corresponding chemical, mechanical and other characteristics such as, for example, resistance to staining, waterproofness, etc. for the special purpose of the molding.

Owing to the closed pores in the carrier layer, the top is completely insensitive to the action of water and also the action of steam as the closed pores prevent rapid absorption of water by the carrier layer material.

Therefore, the pore structure of the carrier layer does not oppose use in kitchen and sanitary facilities.

Usual layer thicknesses for the cover layer are approximately 2 to 10 mm, while a thickness of 10 to 60 mm is often chosen for the carrier layer. Owing to the easy workability of the carrier layer, drawers can, for example, be subsequently built into the carrier layer, for example, in the form of a knife compartment or a table leaf which can be pulled out.

In cases where the multi-layered molding according to the invention is subjected to particularly high stress, a fiber-reinforced layer can be arranged between the cover layer and the carrier layer.

Of course, the carrier layer can be provided with a further cover layer not only on a top surface but also on the surface parallel to it. However, this can only be done after the carrier layer has lost the water component in the drying process. As a rule, temperatures of 50° to 100° C., in some cases even 40° to 50° C., are adequate as drying temperatures. Like the drying temperature, the drying time can be substantially reduced by vacuum drying.

In certain uses, it is advantageous for the cover layer to be translucent, and in these cases a coloring layer is then arranged underneath the cover layer.

In this way the introduction of pigments into the cover layer is avoided. As a rule, these have a strong abrasive effect as the addition of hard inorganic particles such as, for example, titanium dioxide, can hardly be avoided. Such particles cause, for example, in worktops the notorious writing effect, i.e., when metal pots are pushed over the work surface, traces which are very difficult to remove are formed by the abrasion of metal particles.

Finally, a plastic strip made, for example, of acrylate resin, can be molded in a simple way onto the end faces of the molding, i.e., onto the end faces of the layers of the molding so as to obtain as a whole a continuous acrylate covering of the carrier layer. The cover layer itself will preferably consist of acrylate resin, in particular PMMA.

A recipe is given hereinbelow by way of example for the manufacture of an inventive molding made of a water-expanded polymer resin:

100 grams of a 20% PMMA solution in methyl methacrylate (PMMA prepolymer with a molecular weight of approximately 70 000 ) are mixed with 3 grams of trimethylolpropantrionethacrylate as cross-linker. 0.75 grams Hypermer B 246 and 1.5 grams Hypermer 2296 are added as emulsifier components. Dibenzoyl peroxide serves as catalyst and is added in a quantity of 3 grams.

Up to 400 grams of water in the form of an emulsion are introduced into this mixture. Prior to commencement of the casting process, dimethyl para-toluidine is added as activating agent.

Alternatively, a solution can be made for the casting process which except for the activating agent contains all of the above-mentioned components in the given proportion. In addition, a further preparation can be made containing the activating agent but no catalyst component.

The two preparations can then be mixed together prior to the casting of the resin, whereupon the reaction starts but the temperature cannot rise above approximately 46° C. owing to the water components in the emulsion. These mild polymerization conditions result in a product which is very economical to produce as not only the relatively inexpensive acrylate can be used as starting material for the resin component but also this resin component can be further reduced by the use of water and in volume by the substitution of water.

A few examples will be given hereinbelow as to how an increase in viscosity is achievable in the mixture by choosing the proper emulsifiers:

In a specimen consisting of monomeric methyl methacrylate containing the emulsifier, the catalyst and the cross-linker, a viscosity of 3 mpas is measured at 20° C. When a water component of 66.3% is added to this system with the component being otherwise unchanged, i.e., the ratio of water to resin-forming component is now 2:1, an increase in the viscosity to 70 mpas is obtained with the viscosity measurement at 20° C. When the water component is used in a ratio of 4:1, an increase in viscosity to 1 050 mpas is obtained.

If a resin-forming component containing 10% by weight PMMA prepolymer is used, a viscosity of 10 to 11 mpas is obtained in the mixture without water. When the water component is introduced here in the ratio of 2:1 to the resin-forming component, again at 20° C. a viscosity of 2 050 mpas is obtained, whereas in the case where the water component is present in the ratio of 4:1, a viscosity of 29 800 mpas is obtained.

This shows that an excellent possibility is provided, firstly, by the water component and, secondly, likewise to a great extent by the PMMA prepolymer component for adjusting the viscosity of the curable substance for the casting process.

At the same time, a safe choice from the plurality of possible emulsifiers is made possible by this simple test.

The present disclosure relates to the subject matter disclosed in German application No. P 41 04 295.6-44 of Feb. 13, 1991, the entire specification of which is incorporated herein by reference.

What is claimed is:

1. Plastic molding made of a water-expanded polymer resin and produced form a curable mixture containing a water component emulsified by an emulsifier component in a resin-forming component, said resin-forming component of said curable mixture comprising a monomer component and an acrylate cross-linker or a monomer component, a low to medium molecular weight polymeric acrylate polymer and an acrylate cross-linker, and the weight ratio of said water component to said resin-forming component being at least 1:1.

2. Molding as defined in claim 1, wherein said curable mixture contains an inorganic filler particles.

3. Molding as defined in claim 2, wherein the mean particle size of said filler is from 50 μm to 20 000 μm.

4. Molding as defined in claim 2, wherein the particles of said filler are at least partially hollow bodies.

5. Molding as defined in claim 2, wherein said particle-shaped filler contains silicon dioxides or aluminum trihydroxide.

6. Molding as defined in claim 1, wherein said monomer component contains methacrylate, methyl methacrylate, butyl acrylate, acrylonitrile and/or styrene.

7. Molding as defined in claim 1, wherein said cross-linker contains at least one component with two acrylate groups.

8. Molding as defined in claim 7, wherein said cross-linker contains trimethylolpropantrimethylacrylate or ethylene glycol dimethacrylate.

9. Molding as defined in claim 7, wherein said cross-linker is contained in said curable mixture in a proportion of up to 10% by weight.

10. Molding as defined in claim 1, wherein said polymer acrylate has a molecular weight of approximately 40 000 to 100 000.

11. Molding as defined in claim 1, wherein the proportion of said polymeric acrylate in said resin-forming component is 10 to 30% by weight.

12. Molding as defined in claim 1, wherein the weight ratio of said water component to said resin-forming component in said curable mixture is approximately 2:1 to approximately 6:1.

13. Molding as defined in claim 1, wherein said emulsifier component is selected such that said water component in said curable mixture is kept stable in fine droplet form at the storing temperature and at the reaction temperature.

14. Molding as defined in claim 13, wherein said water component is present with a mean droplet diameter of 50 μm at the most.

15. Molding as defined in claim 13, wherein said droplet diameter is from approximately 10 to 30 μm.

16. Molding as defined in claim 13, wherein said emulsifier component is present in said curable mixture in a proportion of approximately 0.5 to 6% by weight dependent on said water content.

17. Molding as defined in claim 13, wherein the formulation of said emulsifier component is such that the emulsion of said curable mixture has a substantially higher viscosity than the resin-forming component.

18. Molding as defined in claim 13, wherein said emulsifier component contains one of several polyoxyethylene block copolymers.

19. Molding as defined in claim 13, wherein said emulsifier component contains mixed esters consisting of glycerol, fatty acids and sorbitans.

20. Molding as defined in claim 13, wherein said emulsifier component contains sulfonates.

21. Molding as defined in claim 1, wherein said curable mixture is selected such that said molding has essentially closed pores after the curing reaction and a drying step.

22. Molding as defined in claim 21, wherein the pore size is on average ≤30 μm.

23. Molding as defined in claim 21, wherein the pore size is on average approximately 20 to 30 μm.

24. Two- or multi-layered molding with a polymer cover layer and a carrier layer which is designed as molding in accordance with claim 1.

25. Two- or multi-layered molding as defined in claim 24, wherein said carrier layer is molded onto said cover layer.

26. Two- or multi-layered molding as defined in claim 24, wherein said cover layer is adhesively connected to said carrier layer.

27. Two- or multi-layered molding as defined in claim 24, wherein said cover layer contains an inorganic, filler particles.

28. Two- or multi-layered molding as defined in claim 26, wherein said inorganic filler has a mean particle size of from 5 to 50 μm.

29. Two- or multi-layered molding as defined in claim 24, wherein said cover layer is approximately 2 to 10 mm thick.

30. Two- or multi-layered molding as defined in claim 24, wherein the thickness of said carrier layer is approximately 10 to 60 mm.

31. Two- or multi-layered molding as defined in claim 24, wherein a fiber-reinforced layer is arranged between said cover layer and said carrier layer.

32. Two- or multi-layered molding as defined in claim 24, wherein said cover layer is translucent and a coloring layer is arranged below said cover layer.

33. Two- or multi-layered molding as defined in claim 24, wherein the end faces of said layers are covered by a molded-on plastic strip.

* * * * *

UNITED STATES PATENT AND TRADEMARK OFFICE
CERTIFICATE OF CORRECTION

PATENT NO. : 5 254 599
DATED : October 19, 1993
INVENTOR(S) : Lothar FRANK It is certified that error appears in the above-identified patent and that said Letters Patent is hereby corrected as shown below:

Column 7, line 36; replace "form" with ---from---.
          line 61; replace "trimethylolpropantrimethyl-
                acrylate" with ---trimethylolpropantrimeth-
                acrylate---.
          lines 66 and 67; replace "polymer" with
                ---polymeric---.

Signed and Sealed this

Ninth Day of May, 1995

Attest:

BRUCE LEHMAN

*Attesting Officer*        *Commissioner of Patents and Trademarks*